Figure 1:
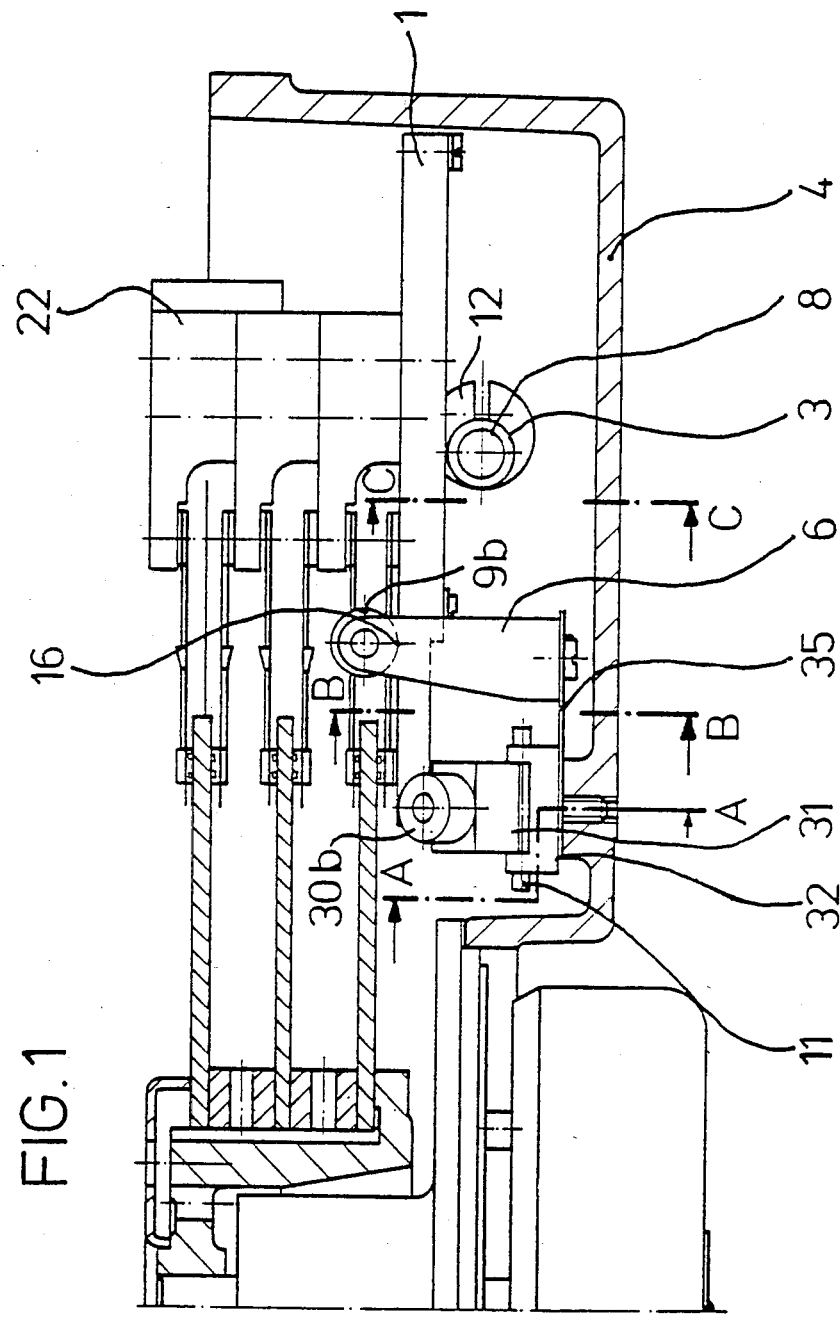

United States Patent [19]

Koenig et al.

[11] Patent Number: 4,672,491
[45] Date of Patent: Jun. 9, 1987

[54] APPARATUS FOR POSITIONING OBJECTS OF LOW MASS, IN PARTICULAR MAGNETIC HEADS

[75] Inventors: Karlheinz Koenig, Ludwigshafen; Lambert Kohl, Wachenheim; Ruediger Witz, Bobenheim; Bernd Roeger, Battenberg, all of Fed. Rep. of Germany

[73] Assignee: BASF Aktiengesellschaft, Ludwigshafen, Fed. Rep. of Germany

[21] Appl. No.: 651,527

[22] Filed: Sep. 17, 1984

[30] Foreign Application Priority Data

Sep. 17, 1983 [DE] Fed. Rep. of Germany ... 8326795[U]

[51] Int. Cl.$^4$ .............. G11B 5/55; G11B 21/08; G11B 5/52; G11B 21/04
[52] U.S. Cl. ........................... 360/106; 360/109
[58] Field of Search .................. 360/106, 109

[56] References Cited

U.S. PATENT DOCUMENTS

| 4,415,941 | 11/1983 | Gibeau et al. | 360/106 |
| 4,456,937 | 6/1984 | Iftikar et al. | 360/106 |
| 4,475,136 | 10/1984 | Manzke et al. | 360/106 |

Primary Examiner—Robert S. Tupper
Assistant Examiner—Melissa J. Koval
Attorney, Agent, or Firm—Keil & Weinkauf

[57] ABSTRACT

In a memory processing unit, a magnetic-head positioning device having a longitudinally actuated carriage with a guide plate carrying the head, or heads, which plate has longitudinal edges and an upper and lower face, one of these faces being in engagement with a spool wheel driving the plate via a belt and the longitudinal edges of the guide plate being guided between a pair of anti-friction bearings. Linear, three-point contact of the guide plate with the bearings and with the spool wheel is insured, regardless of lateral displacement of the guide plate, by mounting the bearings so that they are tiltable, in a plane transverse to the longitudinal movement of the guide plate, by a limited amount.

7 Claims, 11 Drawing Figures

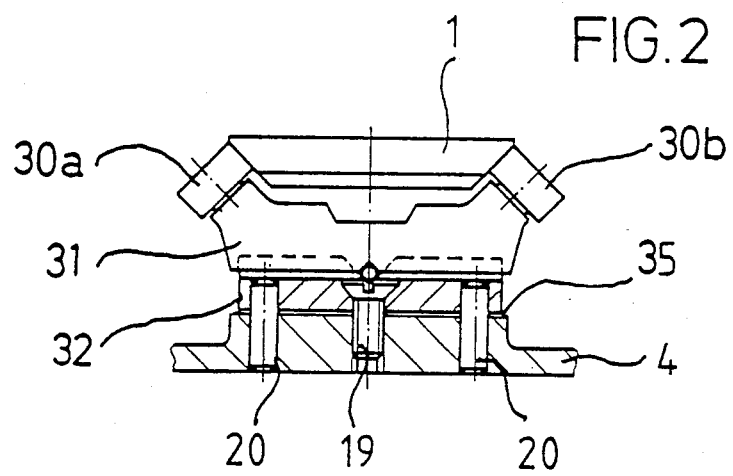
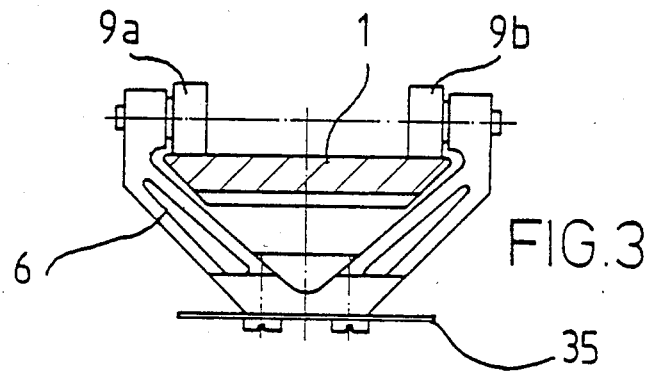

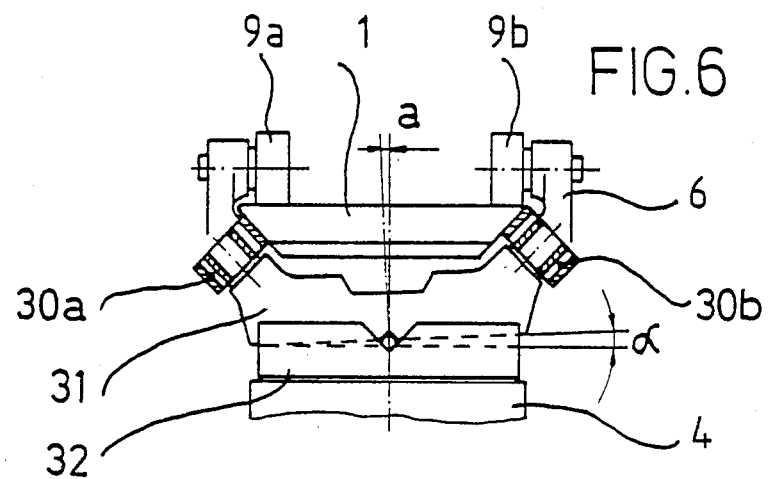
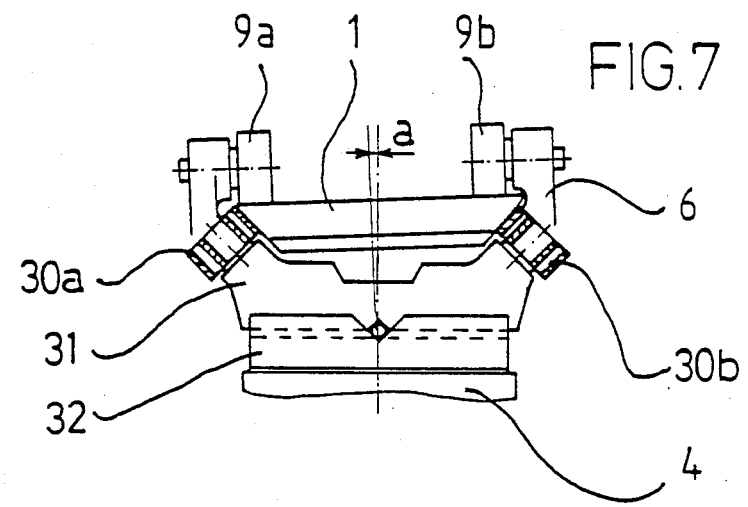

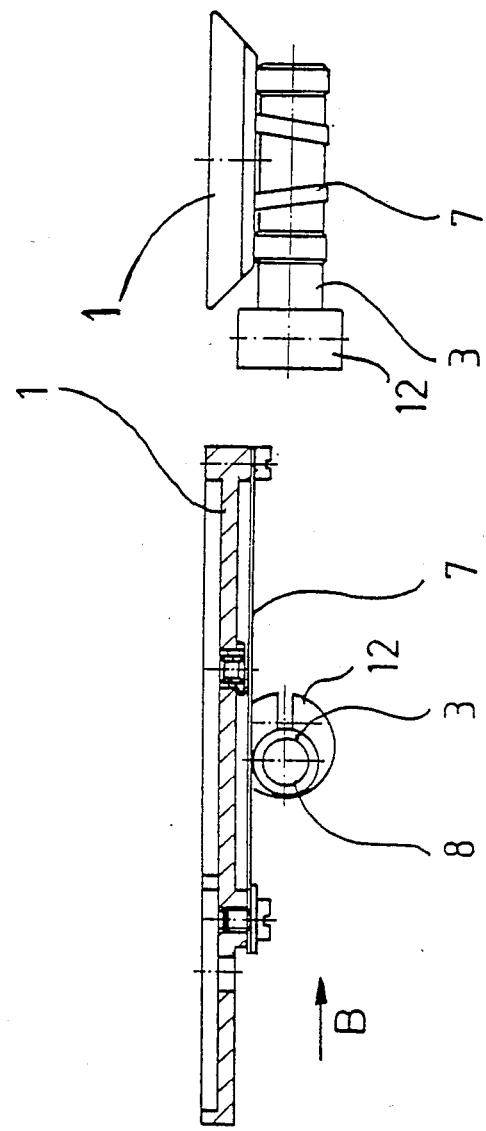

APPARATUS FOR POSITIONING OBJECTS OF LOW MASS, IN PARTICULAR MAGNETIC HEADS

This invention relates to positioning apparatus which has particular, but not exclusive, application to the support of an object of small mass (such as the magnetic read/write head of a magnetic signal storage system) and the accurate positioning of that object (e.g. over a selected magnetic track on a disk in a disk file).

The apparatus to which the invention relates, comprises a frame means displaceably supporting a guide plate on which the object is mounted. The guide plate is connected to a drive means and is restrained by bearing means for movement backwards and forwards along the longitudinal axis of the guide plate. The bearing means comprises a first pair of anti-friction bearings engaging the longitudinal edges of the guide plate, a spool wheel as a support for the plate and a pressure-generating means (e.g. a second pair of anti-friction bearings) which urges the guide plate against the spool wheel. The spool wheel is connected to the guide plate by a flexible drive belt and is rotatably driven by the drive means.

European Laid-Open Application No. 71,083 discloses a positioning apparatus of this type, in which a first pair of anti-friction bearings is fixedly mounted, and a second pair of anti-friction bearings is mounted on a plate spring so that it can be moved in two directions, i.e. in the vertical direction and laterally. A spool wheel serves as a further support, but this did not avoid an unstable 4-point support or an undefined, varying contact with the spool wheel.

Even when the components were manufactured individually with narrow tolerances, using an expensive procedure, these disadvantages, which lead to inaccurate positioning of the heads, could not be reduced sufficiently.

It is an object of the present invention to both lower the manufacturing costs and to increase the reliability and the accuracy of positioning while providing a high degree of protection against the occurrence of errors during manufacture and operation of the apparatus.

We have found that this object is achieved surprisingly well by an apparatus of the type described above, in which the first pair of anti-friction bearings is mounted so that it can be displaced laterally transversely to the direction of longitudinal displacement of the guide plate, thus ensuring that the guide plate is necessarily in continuous contact with the individual bearings of the first pair of anti-friction bearings, and in which the guide plate necessarily lies continuously on the spool wheel, whereby a form of a three-point bearing is created with linear contact arising in each of the three contact points of the bearing.

With the solution according to the invention, the following advantages are obtained individually and/or severally and/or in their entirety:

The 3-point support provides a reliable support for the guide plate, with little wear as a result of the exclusively linear contact. Imprecision in the individual components is not critical, so that the tolerance ranges can be increased. Assembly of the individual components also becomes less critical, and the danger of damage to components is reduced. Tilting of the head during operation of the positioning apparatus is prevented from the outset. As a result of absolutely tension-free and easy positioning, the service life and the accuracy and speed of positioning can be increased, so that a higher recording density and a shorter access time are possible.

It is advantageous if the range of possible lateral displacement is about ±50 μm, preferably from ±25 μm to 35 μm, relative to the ideal position of the guide plate.

This makes it possible to compensate for angular errors, wobbling and/or height changes of the spool wheel attached to a motor shaft, as well as errors in the attachment of the belt to the spool wheel and/or to the guide plate relative to the longitudinal axis of the guide plate.

In practice, the first pair of anti-friction bearings can be mounted on a bearing support and the bearing support can be carried on a bearing pin, so that the bearing support can be tilted in the transverse direction relative to the chassis of the apparatus.

This results in a bearing design which is simple to manufacture and assemble and which is also simple to incorporate subsequently into assembled apparatuses.

Viewed from the disk axis, the first and second pairs of anti-friction bearings and the spool wheel follow in succession.

In this embodiment, a tilting angle range of about ±15°, preferably ±5°, from the vertical is regarded as being advantageous in practice.

Figure 1A:
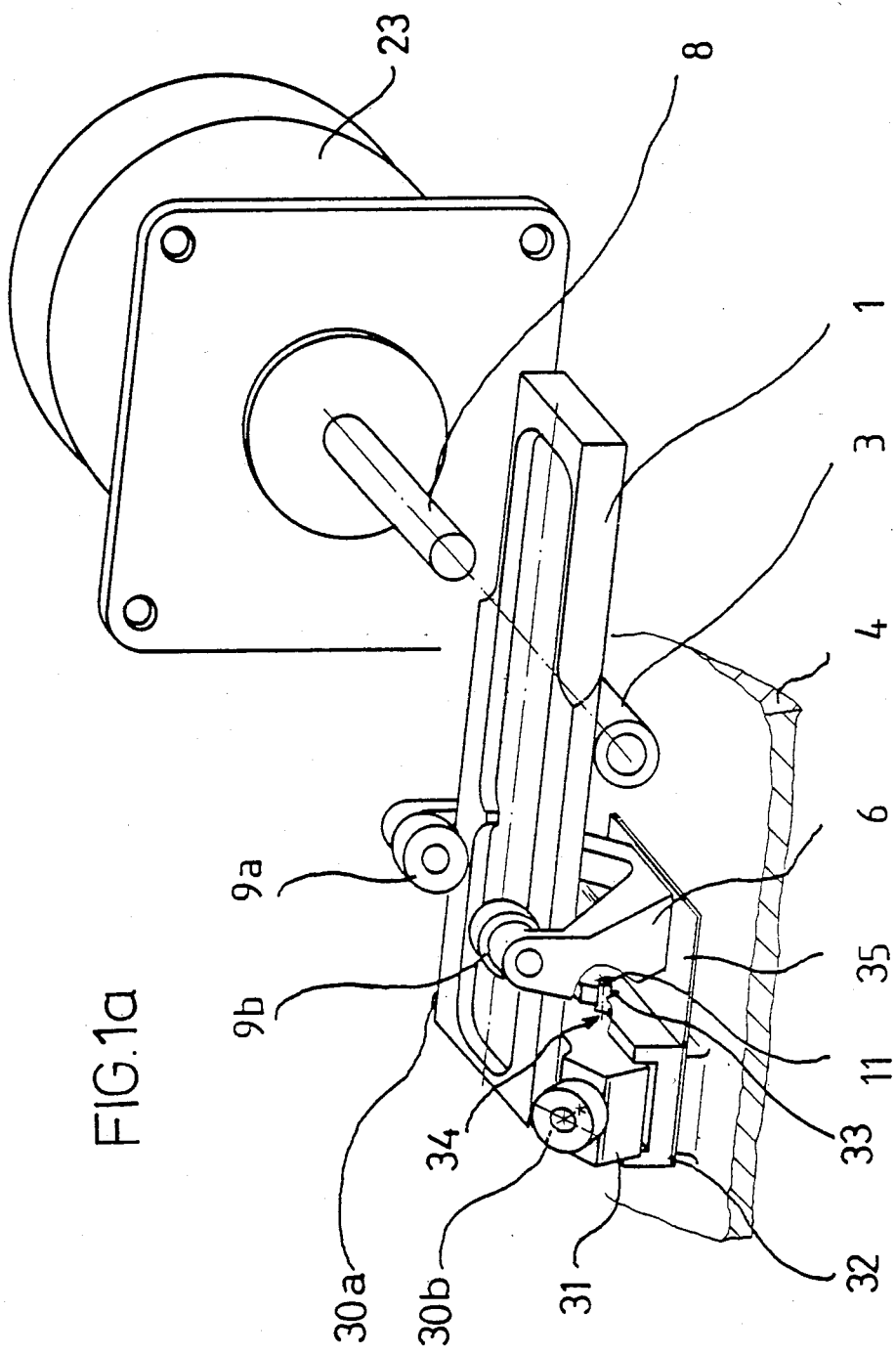
Figure 4:
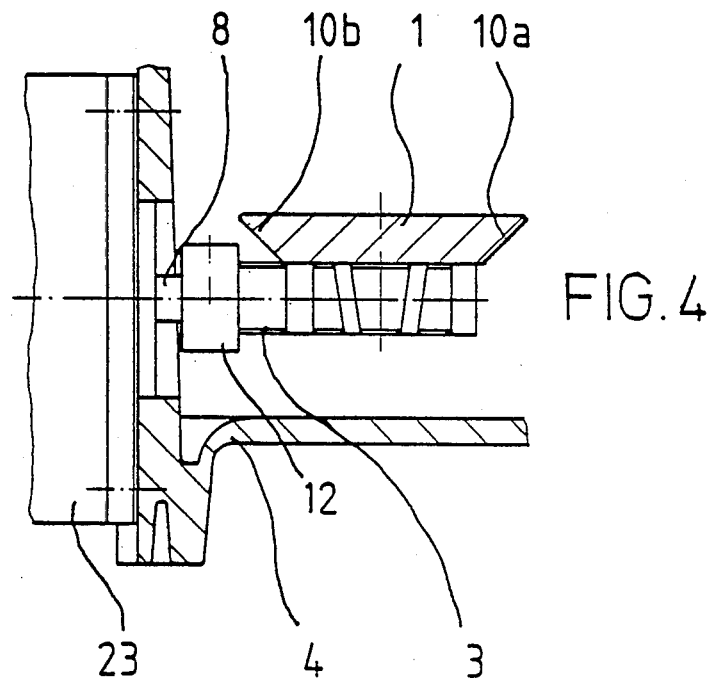
Figure 5:
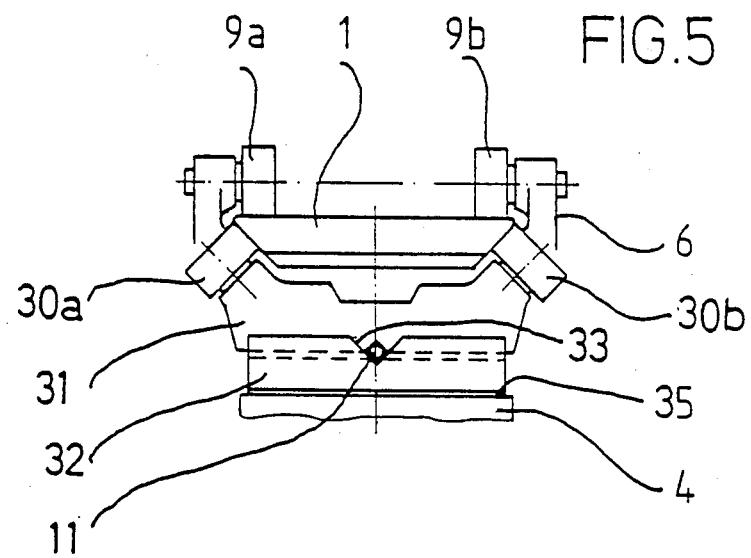
Figure 8:
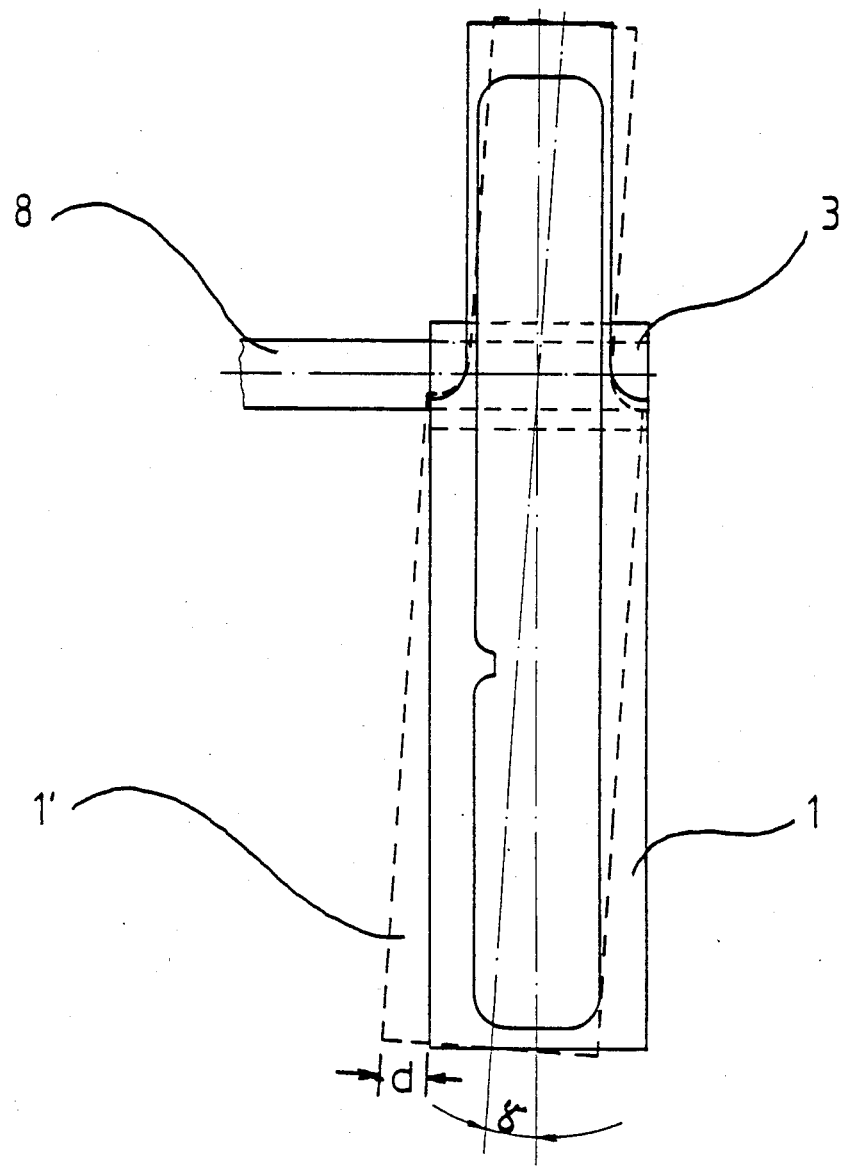

Positioning apparatus in accordance with the invention will now be described by way of example, with reference to the accompanying drawings, in which FIG. 1 shows a sectional side elevation through one embodiment of positioning apparatus, FIG. 1a is a perspective view of the apparatus shown in FIG. 1, FIG. 2 is a section on the line A—A in FIG. 1, FIG. 3 is a section on the line B—B of FIG. 1, FIG. 4 is a section on the line C—C of FIG. 1, FIG. 5 illustrates the guide plate parallel to the chassis base in its middle or ideal position, FIG. 6 shows the guide plate in a laterally displaced position, but still parallel to the chassis base, FIG. 7 illustrates an oblique position of the guide plate, without lateral deviation from the ideal position, FIG. 8 shows a plan of the guide plate, FIG. 9a shows a side view of the guide plate with the spool wheel and the drive belt, and FIG. 9b is a view in the direction of the arrow B in FIG. 9a.

A motor 23 is connected by means of a flange to the chassis 4 of the apparatus and carries on its motor shaft 8 a spool wheel 3, which can be firmly connected to the shaft 8 by means of a releasable clamping element 12. A steel belt 7 passes around the spool wheel 3, the two ends of this belt being firmly attached to the guide plate 1 for the head unit 22. The guide plate 1 is supported on the one hand on the periphery of the spool wheel 3 and, on the other hand, with its oblique surfaces 10a and 10b on anti-friction bearings, preferably roller bearings, 30a and 30b on a bearing support 31, which in turn is mounted on a bearing pedestal 32. It is generally possible to replace the roller bearings used in the preferred embodiment by suitable ball bearings. This is provided with a central notch 33, which holds a bearing pin 11. The bearing support 31 likewise has a notch 34 in its lower surface, and the dimensions of the notches 33 and 34 are based on the thickness of the bearing pin, so that the bearing support 31 with the individual bearings 30a and 30b can be tilted laterally, like a see-saw. A tilting angle range of about ±15° from the vertical is sufficient in practice, but another range may be chosen, preferably ±5°, this adjustment being effected by a change in dimensions.

A plate spring 35 is provided under the bearing pedestal 32, this spring, together with the said pedestal 32, being positioned accurately and attached to the chassis by means of a screw 19. Lateral retention is achieved by means of retention pins 20. During assembly, the bearing pedestal 32 with the plate spring 35 is mounted, after which the bearing pins 11 are placed loosely in the notch, and the bearing support 31 is then likewise placed freely on top. Located midway between spool wheel 3 and bearing support 31 is a bearing cradle 6, which is attached to the free end of the plate spring 35. Individual roller bearings 9a and 9b which bear against the upper surface of the guide plate 1 are mounted on the bearing cradle so that they can be rotated about horizontal axes. The pressure exerted by the individual bearings 9a and 9b on the guide plate 1 is produced by pre-tensioning the plate spring 35; the contact force should be from about 1.5 to 2.5 kp.

After the guide plate 1 has been assembled, it is clamped between the pairs of roller bearings 30a and 30b, 9a and 9b and the spool wheel 3, in a three-axis support. The contact pressure of the plate 1 on the spool wheel 3 is about 1 kp. As a result of this and of the novel arrangement of the individual bearings in relation to the direction of movement of the plate 1, linear contact between plate 1 and bearings 30a and 30b and spool wheel 3 is ensured. All apparatus errors which may be effective transversely to the direction of movement of the plate are compensated for by the bearing support 31 in the form of a see-saw. FIGS. 2 to 5 show the ideal position of the guide plate 1, in the form of sections A—A, B—B and C—C. In FIGS. 9a and 9b, too, the plate 1 is in the ideal position.

Assuming an embodiment of the apparatus in FIG. 5 which cannot be displaced laterally, the tilting angle of bearings 30a and 30b themselves (which as a rule corresponds to a displacement of about 4–10 $\mu$m between outer and inner rings) is capable of compensating for a displacement of plate 1; however, this small tolerance to plate tilt would in practice not be sufficient to prevent one side of the plate 1 from rising off the spool wheel 3, which must inevitably lead to the feared head tilting.

FIGS. 6, 7 and 8 illustrate situations in which deviations from the ideal position in FIG. 5 have occurred. These deviations occur for a large variety of reasons, as described below. Compared with FIG. 5, FIG. 6 illustrates a guide plate 1 which has undergone a parallel lateral displacement. The bearing support 31 is tilted to the left through an angle $\alpha$ which is somewhat greater than 2° in this case, i.e. bearing support 31 has adapted to the parallel lateral displacement of plate 1 by tilting. Without the tilting arrangement of the said support, it is impossible in practice adequately to compensate the lateral displacement. The position of the individual bearings 9a and 9b on bearing cradle 6 remains unchanged.

In the compensated position achieved according to the invention, the positioner remains operational with the required accuracy, and tension-free, easy positioning is ensured.

In FIG. 7, the guide plate 1 has been displaced through an angle "a" with respect to the chassis base 4, i.e. it has been rotated about its longitudinal axis.

In this case, compensation is effected by tilting the bearing cradle 6 by torsional movement of the plate spring 35, with the result that the individual bearings 9a and 9b are adapted to the somewhat oblique position of the plate 1. This also applies to the bearing support 31 and the bearings 30a and 30b, but the bearing cradle 6 remains, untilted, in its normal position.

The possibly damaging effects due to the angular rotation of the plate 1 are once again prevented. As in the case of FIG. 6, a lateral displacement "a" during positioning is unimportant since it continues to be compensated for.

FIG. 8 shows a lateral displacement "d" of the plate in the horizontal plane (plate 1'), the front part of plate 1 being deflected through an angle $\gamma$. For compensation in this case, bearing support 31 would tilt, but not bearing cradle 6.

At this point, it should be stated that the deviations (for example, as shown in FIG. 8) from the longitudinal central axis of plate 1 are about a few multiples of 10 $\mu$m, e.g. ±30–35 $\mu$m, and the angular displacement is of a corresponding magnitude. The lateral mobility is advantageously planned to be about ±50 $\mu$m, preferably from ±25 to ±35 $\mu$m.

FIG. 8 illustrates the angular displacement which can occur if the belt is not attached at right angles to the spool wheel 3 and/or to the plate 1, or in the case of angular errors in the motor shaft in the horizontal plane. The motor shaft can of course also exhibit angular errors in the vertical plane, but this cannot be seen in FIG. 8. If the bearing support 31 were unable to tilt, the plate 1 would not be able to move laterally, which would lead to distortions and hence prevent the guide plate from moving freely. In the extreme case, this would result in only one side resting on the spool wheel 3, causing tilting of the head and errors in positioning.

Because of the novel tilting bearing support 31, angular errors in spool wheel 3 and errors due to wobbling and height changes of this spool wheel are matched by the guide plate 1 (cf., for example, the plate 1' illustrated by means of broken lines in FIG. 8), so that the discrepancies in the positioning process cannot be transformed into inaccuracy or errors in positioning.

As described above, the bearing cradle 6 serves primarily to maintain the contact pressure of plate 1 on spool wheel 3 and on the bearings 30a and 30b. The individual bearings 9a and 9b also act as roller bearings, but this function is only a secondary one. It would therefore be possible to produce the contact pressure by means of a separate contact roller, and for the bearing to be composed of one or more rollers. In any case, it would be necessary to provide the possibility of transverse displacement in this alternative embodiment too, so that errors as shown in FIG. 7 can be compensated for. However, where the errors which occur are as shown in FIG. 6 (i.e. parallel lateral displacement of the plate 1), it would be possible to dispense with the lateral mobility of the contact pressure generating means. Depending on the position, with respect to the guide plate, of the object to be positioned, it would also be possible to alter the sequence of the bearing elements.

The magnetic head positioning apparatus described has been tested successfully in disk drive systems having a track width of 35 $\mu$m and a track pitch of 50 $\mu$m. Because of the methods of mechanical compensation according to the invention, it is possible to decrease the track width to less than 35 $\mu$m.

As a result of the present invention, it is possible to increase the tolerances of the individual components by a factor of about 2, thus making it possible to reduce costs substantially. The highest permissible angular error in the motor shaft 8 when the invention is not used is in practice only 35 μm, but this can be increased to, for example, more than 50 μm if the present invention is employed. This increase in tolerance is reflected in a reduction in the number of motors rejected after manufacture from a previous figure of 50% to about 1-2%.

A head positioning system for scanning systems has been specifically described above and an object positioning apparatus is claimed below. Clearly, the intention is also to include any similar use of the novel apparatus or of a modification within the scope of specialist knowledge, for example its use in robots, where speed and accuracy of a movement-producing apparatus are important, and in the case of continuously repeated identical or similar movement processes.

Hence, possible uses are in general in signal recording/reproduction systems, signal storage systems and positioning systems, and for any type of signal recording/reproduction/storage, for example for video, data, audio or control signals.

We claim:

1. A device for positioning objects of low mass, especially for positioning magnetic head over preselected magnetic tracks on at least one magnetic disk driveable about an axis of rotation, in a memory processing unit, said device including a frame and a carriage substantially consisting of a guide plate carrying at least one of said objects of low mass and having opposite longitudinal edges and opposite faces, and said device also including bearing means mounted on said frame and including drive means for moving said guide plate, with the aid of said bearing means, along said longitudinal edges toward and away from said axis of rotation, the bearing means comprising a pair of anti-friction bearings respectively engaging said opposite longitudinal edges of the guide plate, and a spool wheel driven by said drive means and engaging one of said opopsite faces, and said device further including means engaging the other of said opposite faces for urging said guide plate in the direction of said spool wheel, said pair of anti-friction bearings including a bearing support and each of the bearings of said pair, and the bearing support being mounted on a bearing pin so that it can be tilted with respect to the frame laterally of the guide plate, whereby said guide plate, in effect, can be laterally displaced transversely to the direction of longitudinal movement, and substantially in the plane, of the guide plate, the amount of lateral displacement lying in the range of ±50 μm relative to a mean central position of the guide plate, the spool wheel and said pair of anti-friction bearings defining a three-component bearing arrangement with linear contact between the guide plate and each of the three components of the bearings means.

2. A device as claimed in claim 1, wherein the amount of lateral displacement is from about ±25 μm to about ±35 μm, relative to a mean central position of the guide plate.

3. A device as claimed in claim 1, wherein the amount of tilt of the bearing support laterally of the guide plate lies in the range of about ±15°.

4. A device as claimed in claim 1, wherein the amount of tilt of the bearing support laterally of the guide plate lies in the range of about ±5°.

5. A device as claimed in claim 1, wherein the longitudinal direction of the guide plate, a first, laterally displaceable, pair of anti-friction bearings, a second pair of anti-friction bearings constituting the urging means, and the spool wheel follow in sequence.

6. A device as claimed in claim 5, in which said device includes a flexible drive belt the two ends of which are secured to the two ends respectively of the guide plate and which is wrapped around the spool wheel.

7. A device for positioning objects of low mass, especially for positioning magnetic heads over preselected magnetic tracks on at least one magnetic disk driveable about an axis of rotation, in a memory processing unit, said device including a frame and a carriage substantially consisting of a guide plate carrying at least one of said objects of low mass and having opposite longitudinal edges and opposite faces, and said device also including bearing means mounted on said frame and including drive means for moving said guide plate, with the aid of said bearing means, along said longitudinal edges toward and away from said axis of rotation, the bearing means comprising a first pair of roller bearings respectively engaging said opposite longitudinal edges of the guide plate, and a spool wheel driven by said drive means via a belt the two ends of which are affixed to the two ends, respectively, of said guide plate and said spool wheel engaging one of said oppooiste faces, and said device further including a second pair of roller bearings engaging the other of said opposite faces for urging said guide plate in the direction of said spool wheel, said first pair of roller bearings including a bearing support and each of the bearings of said pair, and the bearing support being mounted on a bearing pin so that it can be tilted with respect to the frame laterally of the guide plate, whereby said guide plate, in effect, can be laterally displaced transversely to the direction of longitudinal movement, and substantially in the plane, of the guide plate, the amount of lateral displacement lying in the range of ±50 μm relative to a mean central position of the guide plate, and whereby it is insured that the guide plate is in continuous contact with each of the roller bearings of the first pair and also that the guide plate continuously lies flat on the spool wheel, so that a three-point bearing arrangement with linear contact at each point is provided.

* * * * *